No. 829,264. PATENTED AUG. 21, 1906.
E. J. GEORGE.
EYEGLASS AND SPECTACLE MOUNTING.
APPLICATION FILED FEB. 19, 1906.

Witnesses
Edw. R. Barrett
Louis B. Erwin

Inventor
Edgar J. George
by Rector Hibben & Davis
His Attys.

UNITED STATES PATENT OFFICE.

EDGAR J. GEORGE, OF CHICAGO, ILLINOIS.

EYEGLASS AND SPECTACLE MOUNTING.

No. 829,264.          Specification of Letters Patent.          Patented Aug. 21, 1906.

Application filed February 19, 1906. Serial No. 301,874.

*To all whom it may concern:*

Be it known that I, EDGAR J. GEORGE, a citizen of the United States, residing at Chicago, Cook county, Illinois, have invented certain new and useful Improvements in Eyeglass and Spectacle Mountings, of which the following is a specification.

This invention relates, primarily, to the subject of eyeglass and spectacle mountings, although its uses are not necessarily confined to that particular art.

The principal object of the invention is to dispense with removably-inserted fastenings, such as the ordinary small screw, for securing together the lens of an eyeglass or spectacle and the stud-straps of a skeleton mounting. Such fastenings are inclined to work loose and require constant readjustment in order to firmly hold the lens in its proper position with relation to the mounting. The present invention does away entirely with any such form of fastening, and hence effectually cures the defect of looseness between lens and mounting.

More specifically stated, the object of the invention is to unite the lens and the mounting by means of a substance which may be applied in fluid form through the orifice of the stud-strap and will adhere to the lens and solidify over the sides of the said orifice.

Having thus indicated the objects and purposes of the invention, it may be said to consist in the manufacture specified in the appended claims. These claims point out the characteristic and essential elements in the manufacture, while the accompanying drawings illustrate a preferred form of the embodiment of the invention.

Figure 1:
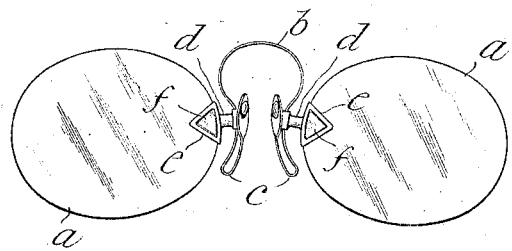
Figure 2:
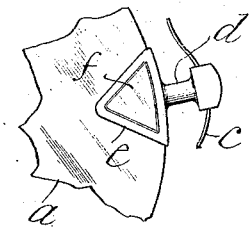
Figure 3:
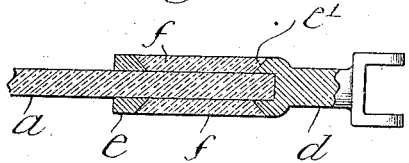

Of these drawings, Figure 1 represents in rear elevation a pair of eyeglasses with skeleton mountings secured to the lenses by the use of the present invention. Fig. 2 represents one of the studs on a larger scale with a fragment of a lens, and Fig. 3 represents the same parts on a still larger scale and in longitudinal sections.

In the said drawings the reference-letter *a* designates the eyeglass-lenses; *b*, the spring or nose-piece mounting; *c*, the nose-guards; *d*, the studs to which the said spring and nose-guards are secured, and *e* the straps formed integral with the studs and overlying the opposite sides of the lens. These straps are ordinarily made with orifices through which small screws are inserted, the orifice in one strap of a stud being countersunk to accommodate the head of the screw and the orifice in the other strap of said stud being screw-threaded to coöperate with the shank of the screw and the lens being drilled for the passage of the screw which operates to clamp the lens between the straps. In the form here shown the straps are triangular in outline and the orifice is likewise triangular, the inside edges of the metal forming the triangle being beveled, as shown at *e′* in Fig. 3, so as to make the orifice countersunk.

In carrying out the present invention in the form here shown both straps of the stud are of the above-described construction. The lens to be secured between these straps does not require boring, as the lens and the straps are not united by means of a fastener necessarily run through the lens. Silicate of potash or soda, commonly called "liquid" or "water" or "soluble" glass, is employed as a binder for uniting the lens and the straps. The lens is properly adjusted between the straps and then the liquid glass is dropped into the orifice of the strap in sufficient quantity to slightly exceed the capacity of the orifice. The liquid glass will be dropped into the orifice in the form of a globule, which will rise slightly above the level of the outer surface of the strap. This form of binder applied in the fluid state will of course entirely fill the orifice of the strap, and inasmuch as the quantity used slightly exceeds the capacity of the orifice the contraction which accompanies the solidifying of the fluid will still leave the latter in close engagement with the beveled sides of the metal. At the same time the substance adheres strongly to the surface of the lens, and it will be obvious that by such means an absolutely firm connection is made between the lens and the strap. The quantity of the liquid glass used is so calculated as to provide for its coming flush with the outer surface of the coming flush with the outer surface of the strap when solidified. In the drawings reference-letter *f* designates a binder produced in this manner on both sides of each lens. In the case of spectacles the temple-studs as well as the nose-pieces would also be secured to the lens by the same process.

It will be seen that the above-described method of uniting glass and metal is perfectly adapted to accomplish the objects heretofore set forth, and it will now be further apparent that the invention is not necessarily confined to the eyeglass and spectacle art. Neither is the invention confined to the one substance herein specified, it being sufficient for the general purposes of the invention to employ any substance which can be used in fluid form and which will adhere to glass. It is not of course necessary for the substance to adhere also to metal. In fact, the particular substance above specified does not adhere to metal; but the binding of the metal to the glass is insured by the substance solidifying over the countersunk portions of the metal. It is of course desirable to employ a substance which is soluble, so as to facilitate replacement of broken lenses without requiring new mountings. The substance herein specified is soluble, and hence its use does not prevent replacement of broken lenses by new lenses in the same mountings. This particular substance also has the advantage of being transparent, like the lenses themselves.

What is claimed is—

1. In combination with the lens of an eyeglass or spectacle, a mounting comprising a stud-strap overlying the lens, and a binder adherent to the lens and taking over a portion of said strap.

2. In combination with the lens of an eyeglass or spectacle, a mounting comprising a stud-strap overlying the lens, and a binder applied in fluid form adherent to the lens and taking over a portion of said strap.

3. In combination with the lens of an eyeglass or spectacle, a mounting comprising a stud-strap overlying the lens and having an orifice extending through it, and a binder applied in fluid form adherent to the lens and filling the orifice of the strap.

4. In combination with the lens of an eyeglass or spectacle, a mounting comprising a stud-strap overlying the lens and having an orifice extending through it and countersunk on the outer side, and a binder adherent to the lens and filling the orifice of the strap.

5. In combination with the lens of an eyeglass or spectacle, a mounting comprising a stud-strap overlying the lens and having an orifice extending through it and countersunk on the outer side, and a binder applied in fluid form adherent to the lens and filling the orifice of the strap.

6. In combination with the lens of an eyeglass or spectacle, a mounting comprising a stud-strap overlying the lens, and a binder of soluble glass adhering to the lens and taking over a portion of said strap.

7. In combination with the lens of an eyeglass or spectacle, a mounting comprising a stud-strap overlying the lens and having an orifice extending through it, and a binder of soluble glass adhering to the lens and filling the orifice of the strap.

8. In combination with the lens of an eyeglass or spectacle, a mounting comprising a stud-strap overlying the lens and having an orifice extending through it and countersunk on the outer side, and a binder of soluble glass adhering to the lens and filling the orifice of the strap.

9. An eyeglass or spectacle stud having straps to engage opposite sides of the lens, each strap having an orifice extending through it and countersunk on the outer side.

10. The combination with the lens of eyeglasses or spectacles, of a stud-strap overlying the opposite sides of the lens and having countersunk orifices extending through it on both sides of the lens and countersunk on the outer sides and binders of a substance adherent to glass applied in fluid form in the orifices of the straps.

11. An eyeglass or spectacle mounting comprising a projection unified with a side or face of the lens and a stud-strap engaged with said projection.

12. An eyeglass or spectacle mounting comprising an undercut projection unified with the lens and a stud-strap orificed and countersunk for engagement with said projection.

13. An eyeglass or spectacle mounting comprising projections unified with the lens on opposite sides thereof and a stud-strap straddling the lens and engaged with both projections.

14. An eyeglass or spectacle mounting comprising undercut projections unified with the lens on opposite sides thereof and a stud-strap straddling the lens and orificed and countersunk for engagement with both of said projections.

15. In combination with the lens of an eyeglass or spectacle, a mounting comprising a stud-strap overlying the lens, and a binder adherent to the lens and taking over a portion of said strap but non-adherent thereto.

16. In combination with the lens of an eyeglass or spectacle, a mounting comprising a stud-strap overlying the lens and having an orifice extending through it, and a binder adherent to the lens and filling the orifice of the strap, but non-adherent thereto.

17. In combination with the lens of an eyeglass or spectacle, a mounting comprising a stud-strap overlying the lens, and a binder applied in fluid form adherent to the lens and taking over a portion of said strap but non-adherent thereto.

18. In combination with the lens of an eyeglass or spectacle, a mounting comprising a stud-strap overlying the lens, and having an orifice extending through it, and a binder applied in fluid form adherent to the lens and filling the orifice of the strap but non-adherent thereto.

19. In combination with the lens of an eyeglass or spectacle, a mounting comprising a stud-strap overlying the lens and having an orifice extending through it and countersunk on the outer side, and a binder applied in fluid form adherent to the lens and filling the orifice of the strap but non-adherent thereto.

20. In combination with the lens of an eyeglass or spectacle, a mounting comprising a metal stud-strap overlying the lens, and a binder of soluble glass adhering to the lens and taking over a portion of said strap.

21. In combination with the lens of an eyeglass or spectacle, a mounting comprising a metal stud-strap overlying the lens and having an orifice extending through it, and a binder of soluble glass adhering to the lens and filling the orifice of the strap.

22. In combination with the lens of an eyeglass or spectacle, a mounting comprising a metal stud-strap overlying the lens and having an orifice extending through it and countersunk on the outer side, and a binder of soluble glass adhering to the lens and filling the orifice of the strap.

23. The combination with the lens of eyeglasses or spectacles, of a stud-strap overlying the opposite sides of the lens and having countersunk orifices extending through it on both sides of the lens and countersunk on the outer sides, and binders of a substance adherent to glass applied in fluid form in the orifices of the straps but non-adherent thereto.

EDGAR J. GEORGE.

Witnesses:
FRANK PARKER DAVIS,
LOUIS B. ERWIN.